Patented Dec. 6, 1932                                                           1,890,261

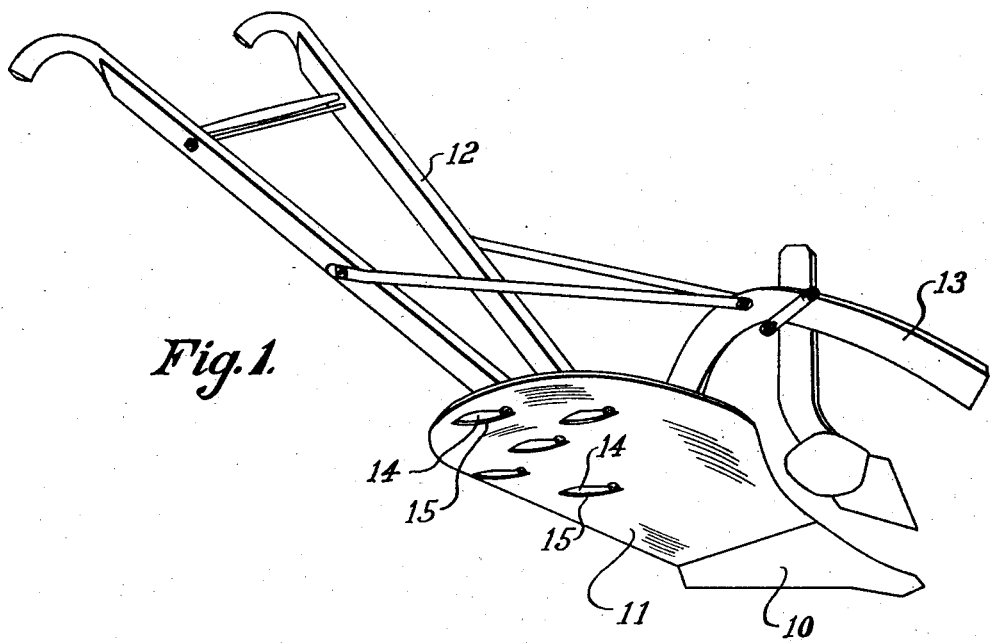
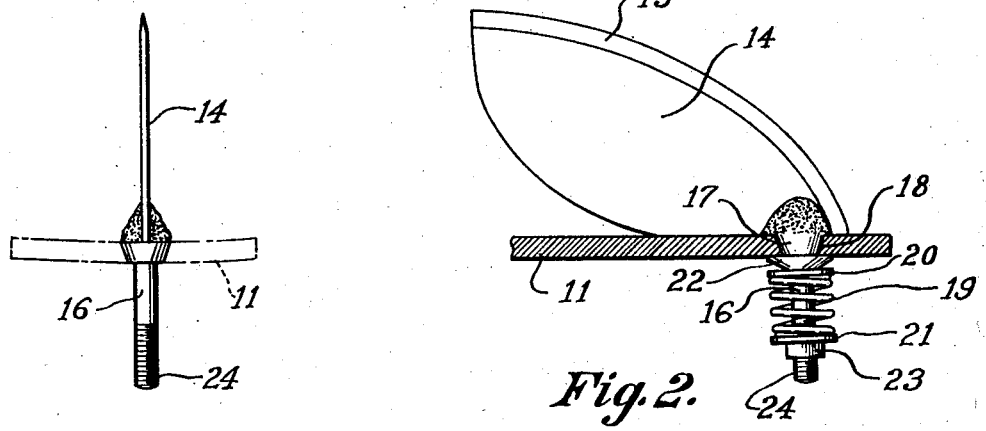

UNITED STATES PATENT OFFICE

ANDREW J. MILLER, OF MASSILLON, OHIO

ATTACHMENT FOR PLOWS

Application filed July 21, 1930. Serial No. 469,388.

The invention relates to plows and more particularly to an attachment for cutting the earth as the furrow is turned.

The object of the improvement is to provide a plurality of pivoted knife blades upon the moldboard adapted to cut into the earth as the furrow is turned, cutting it into relatively narrow strips; the device being especially adapted for use in plowing sod or meadow land.

The above and other objects may be attained by constructing the plow in the manner illustrated in the accompanying drawing, in which Figure 1 is a perspective view of a plow provided with the improved attachment;

Fig. 2, an enlarged side elevation of one of the cutting blades showing the manner in which the same is pivotally mounted upon the moldboard; and Fig. 3, an edge elevation of the same.

Similar numerals refer to similar parts throughout the drawing.

The invention is adaptable to any plow of usual and ordinary construction and for the purpose of illustration a plow is shown comprising the plowshare 10, moldboard 11, handles 12 and beam 13 which may be of any desired construction.

The attachment to which the invention pertains is in the nature of a blade 14 pivotally mounted upon the moldboard and having the arcuate rearwardly curved cutting edge 15 adapted to engage the under side of the earth as the furrow is turned, cutting the earth into strips. The arcuate cutting edge provides for cutting through the earth with a minimum of resistance.

This blade is provided with a shank 16 preferably having the conical head portion 17 to which the forward end of the blade is connected, this conical head being journaled through a tapered aperture 18 in the moldboard so that the shank 16 is perpendicularly disposed to the moldboard.

For the purpose of normally holding the blade against rotation upon its pivot, but permitting the same to freely rotate as the plow is passed through the earth, a coil compression spring 19 may be located around the shank between the washers 20 and 21, the upper washer 20 engaging a conical washer 22 which is normally urged toward the rear side of the moldboard while an adjusting nut 23 is located upon the threaded extremity 24 of the shank and contacts with the washer 21.

In practice there are preferably a plurality of these blades located in spaced positions upon the moldboard, as best shown in Fig. 1, and so arranged that as the plow is passed through the earth they will engage the under side of the furrow being turned at spaced points, cutting the earth into a plurality of narrow strips which not only reduces the power necessary to pull the plow but breaks up the earth in better condition for harrowing and cultivating.

It will be seen that as these blades are drawn through the earth they will swing upon their pivots, following the direction of movement of the earth passing over the moldboard.

I claim:

1. In combination with a plow having a moldboard, a blade pivotally mounted upon the moldboard upon an axis perpendicular thereto and free to swing upon its pivot as the plow is pulled through the earth, and compression means for normally holding the blade against movement when the plow is inoperative.

2. In combination with a plow having a moldboard, a blade having a rearwardly curved cutting edge pivotally mounted upon the moldboard upon an axis perpendicular thereto and free to swing upon its pivot as the plow is pulled through the earth, and compression means for normally holding the blade against movement when the plow is inoperative.

3. In combination with a plow having a moldboard, a plurality of blades pivotally mounted at the rear portion of the moldboard upon axes perpendicular thereto and free to swing upon their pivots as the plow is pulled through the earth to cut the earth passing over the moldboard into strips, and spring means for normally holding each blade against movement when the plow is inoperative.

4. In combination with a plow having a moldboard, a plurality of blades pivotally mounted at the rear portion of the moldboard upon axes perpendicular thereto and free to swing upon their pivots as the plow is pulled through the earth to cut the earth passing over the moldboard into strips, each blade having a rearwardly curved cutting edge, and spring means for normally holding each blade against movement when the plow is inoperative.

5. In combination with a plow having a moldboard, a blade having a rearwardly curved cutting edge, a bolt shank secured to the blade for extending through the moldboard in a direction perpendicular to the moldboard and pivotally connected therewith, a nut on the end of the bolt shank, and spring means adapted to be interposed between the nut and the moldboard for normally holding the blade against pivotal movement relative to the moldboard when the plow is inoperative.

In testimony that I claim the above, I have hereunto subscribed my name.

ANDREW J. MILLER.